United States Patent
Violleau et al.

[15] 3,693,317
[45] Sept. 26, 1972

[54] APPARATUS FOR IMPREGNATING FABRICS, MORE PARTICULARLY GLASS CLOTHS, WITH PLASTICS

[72] Inventors: Andre Violleau, Vitrolles Le Roucas; Rene Louis Coffy, Marseille, both of France

[73] Assignee: Societe Nationale Industrielle Aerospatiale, Paris (Seine), France

[22] Filed: Dec. 21, 1971

[21] Appl. No.: 210,315

Related U.S. Application Data

[62] Division of Ser. No. 886,198, Dec. 18, 1969, Pat. No. 3,653,174.

[52] U.S. Cl. ............................................. 53/111 R
[51] Int. Cl. ............................................. B65b 55/22
[58] Field of Search.........53/111 R; 117/119; 118/50

[56] References Cited

UNITED STATES PATENTS 1,842,111   1/1932   Pater ......................... 118/50
3,449,152   6/1969   Detrick et al. .......... 117/119 X

*Primary Examiner*—Travis S. McGehee
*Attorney*—Eric H. Waters et al.

[57] ABSTRACT

An apparatus for impregnating fabrics, more particularly but not exclusively glass cloths, with plastics such as synthetic resins still in the fluid state, wherein a roll of the fabric is first subjected to the action of a substance intended to enhance the intimacy of the bond between the fibers and the impregnating plastic, and is thereafter exposed to a vacuum together with said plastic, following which the plastic content of the fabric is calibrated and the impregnated fabric is finally packaged for storage.

10 Claims, 8 Drawing Figures

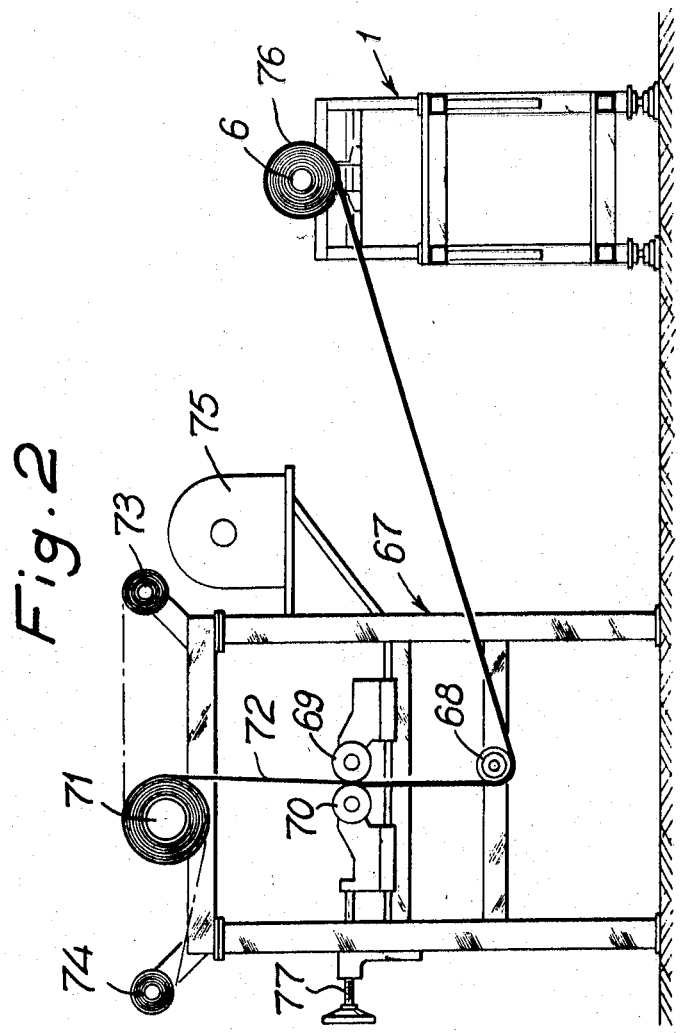

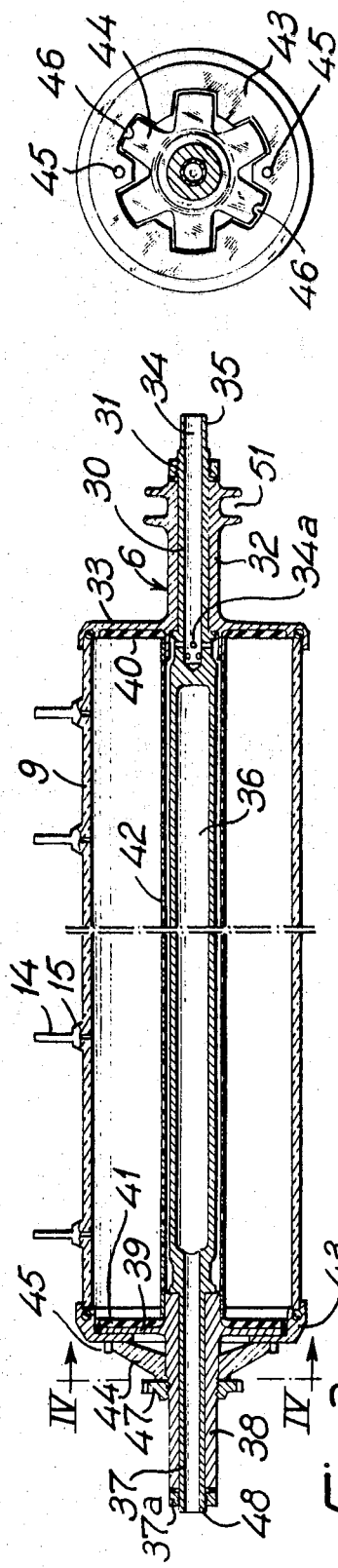

APPARATUS FOR IMPREGNATING FABRICS, MORE PARTICULARLY GLASS CLOTHS, WITH PLASTICS

This application is a division of application Ser. No. 886,198, filed Dec. 18, 1969, now U.S. Pat. No. 3,653,174, issued Apr. 4, 1972.

DESCRIPTION

Laminated materials based on glass-fiber and plastics are coming into wider use in various technical fields and notably in aeronautical engineering because of their fundamental properties of static strength, fatigue strength, lightness and ease of utilization.

Aside from such factors as the choice of the constituents and the utilization techniques, any advances made in the impregnating technique not only greatly influences such factors but also has far-reaching effects on the overall results obtained.

The prior art impregnating techniques include manual impregnating methods and pre-impregnating methods.

Manual impregnations can be awkward to carry out, especially with resins which are very viscous at ordinary temperatures, particularly in the case of tightly woven fabrics made of twisted yarn. Mediocre wetting of the yarn, the numerous included bubbles of all sizes and the unevenness of the resin content result in an indifferent product quality. The work is moreover hindered by the odors and vapors given off and its duration is limited by the pot-life of the resin.

In known pre-impregnation techniques, conservation of the semi-finished product is limited and costly, forming it is tricky and it is usually necessary to perform the polymerization under pressure and at high temperature to obtain an end product the quality of which is still no better than mediocre.

Although other techniques, such as vacuum impregnation under cover, also exist that do not have all the disadvantages mentioned above, they are applicable only in very special cases in industry, and in the aeronautical field in particular.

The present invention has for its object to overcome all the drawbacks inherent in these prior art techniques while at the same time broadening the field of application.

The invention accordingly provides an impregnation apparatus wherein is exposed to a vacuum, in a manner well known per se, an entire roll of fabric and resin, though only after the fabric has been treated with a preferably gaseous substance for improving the intimacy of the fiber-resin bond, in calibrating the resin content of the fabric and in packaging the impregnated fabric for storage, the whole being performed while the resin, irrespective of its composition, is maintained, at least during impregnation, at a temperature endowing it with optimum viscosity.

It is preferable for the resin to penetrate the roll of fabric from its center, to pass through the fabric from the interior to the exterior responsively to the suction due to the reduced pressure maintained in the chamber in which impregnation is taking place, the operation being supervised visually through a transparent wall of the chamber.

In one specific embodiment, enhanced intimacy of the bond between the fabric and the resin is obtained by initially placing the glass-fiber fabric in contact with carbon dioxide, such intimacy being already achieved by a debubbling of the resin before and during impregnation.

Calibration is accomplished by unrolling the fabric after the roll thereof is impregnated, and by causing the impregnated fabric to pass after drying between two rollers having a set gap therebetween.

Prestorage packaging is effected by covering at least one but preferably both faces of the impregnated fabric with waterproof sheet material which is chemically incompatible with the impregnating substance.

Preferably, the impregnated fabric is reformed into a roll with the protective sheet (s), and the roll is then placed in a bag and stored at the required temperature.

Whereby there is obtained a pre-impregnated fabric which is easy to manipulate, cut and shape and which can be used as it is in the "wet" state, notably for providing all kinds of revetments or structural members.

The above-disclosed apparatus offers the following advantages over the prior art:

no pressure is required for the resin to penetrate into the fabric and pass therethrough;

the roll can be kept stationary during the impregnation, since it is unnecessary to unroll it to ensure uniform penetration;

several successive impregnations are not necessary to obtain a high resin content in the fabric;

no complications due to the presence of a solvent (such as eliminating it by drying) arise during the impregnating cycle.

Although it is mechanically possible to use the above apparatus for preparing thick material made of several fabric layers, notably by the use of a plurality of rollers, the material would subsequently have to be stored flat and shaping would be more delicate. For this reason it is preferable to unite the superimposed layers during the shaping operation itself, while at the same time progressively smoothing the material in order to drive out possible air bubbles.

The weave itself may consist of orthogonal yarns directed respectively parallel and perpendicular to the rolling axis, or of oblique yarns, or it may be of any other convenient kind.

It is thereby possible to obtain either stressed structures or revetments, or revetments on honeycomb structures, that stand up extremely well to peeling tests.

The present invention contemplates apparatus having means fulfilling the above mentioned condition, comprising at least one impregnation section equipped with means for inserting a roll of fabric into an impregnation chamber and extracting the impregnated roll therefrom, at least one calibrating station and at least one packaging station, the latter two stations being preferably mutually coordinated.

In one specific embodiment, the impregnation chamber has a wall which is movable relatively to the roll-supporting beam in order to allow the same to be covered and uncovered.

The beam itself includes means for receiving and distributing the resin, and the envelope bears a plurality of vacuum distributing connections with an interposed safety pot.

The impregnation station further includes vacuum-generating means, resin-distributing means and means for distributing a substance which improves the bond between the resin and the fabric, such latter means being preferably a source of carbon dioxide in the case of glass-cloth.

Said apparatus likewise includes means for debubbling the resin contained in a reservoir associated to the resin distributing means.

Obviously, alternative embodiments could be devised in which the chamber walls are stationary and associated to movable roll inserting and extracting means.

The description which follows with reference to the accompanying non-limitative exemplary drawings of preferred forms of embodiment will give a clear understanding of how the invention can be carried into practice.

In the drawings:

FIG. 2 shows in schematic profile how the machine of FIG. 1 is associated with apparatus for calibrating the impregnation and packaging the impregnated fabric;

FIG. 3 shows in diagrammatic section the system formed by a beam and the impregnating chamber covering the same;

FIG. 4 is a sectional view taken on line IV—IV of FIG. 3;

FIG. 5 is a side elevation view showing the profile of the upstream beam support;

FIG. 6 is an end view of the beam support in FIG. 5;

Figure 1:
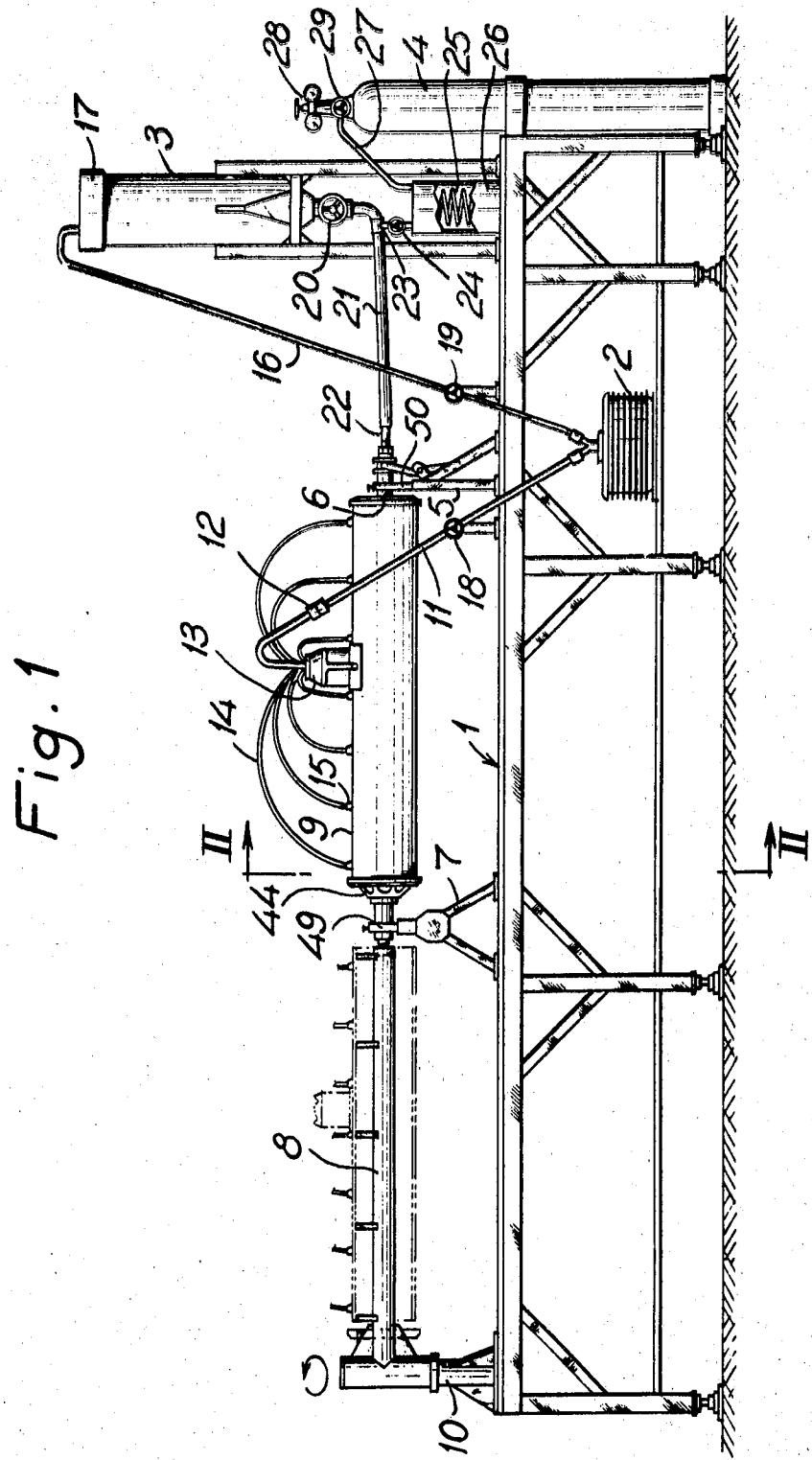
FIG. 1 is a side elevation view of a machine for impregnating a roll of fabric.

The apparatus illustrated in the drawings includes, on a machine stand 1, a vacuum pump 2, an elevated resin container 3 and, at one side of stand 1, a carbon dioxide bottle 4. Above said stand is an upstream support 5 for a beam-forming shaft 6, a downstream support 7 therefor and a retractable arm 8 for receiving the movable portion of the impregnation chamber 9, which chamber is preferably formed by a transparent cylindrical envelope, said arm 8 being pivotally mounted as an outrigger on a trunnion 10. In the particular example described hereinafter, the term "resin" will be used to designate the system comprising the resin itself and its hardening agent.

The arm 8 may be aligned coaxially with the trunnion 10.

The vacuum pump 2 includes a suction pipe 11 which, by means of a quick-disconnect union 12, can be connected to a safety pot 13 mounted on envelope 9, and this pot is in turn connected through flexible lines 14 to a plurality of vacuum distributing unions 15.

Through a further pipe 16, vacuum pump 2 is connected to the leaktight cover 17 of the pressurized resin container 3. The pipes 11 and 16 are quipped with isolating valves 18 and 19 used to evacuate the envelope and debubble the resin in container 3 by depression, by way of a preliminary treatment.

The base of container 3 is equipped with a shut-off valve 20 upstream of a conduit 21 capable of being connected via a detachable union 22 to the corresponding end-coupling of shaft 6.

A bleed 23 is provided on conduit 21 and communicates, via a shut-off valve 24, with a heat exchanger 25 having its coil located inside a heating vessel 26 which may contain any suitable fluid, said coil communicating through a pipe 27 with the pressure relief gear 28 which surmounts bottle 4, with an interposed needle valve 29.

At its upstream end, shaft 6 comprises a bearing 30 over which is engaged and secured by a nut 31 a sleeve 32 formed with a large rimmed flange 33. The bearing 30 is also formed with an axial blind hole 34 which, above its inner end-face, embodies radial passages 34a. This blind hole is intended to place said bearing in communication with conduit 21 via end-coupling 25.

Behind the intermediate end-face limiting blind hole 34, the bearing 30 is extended by a hollow body portion 36 of said shaft 6, which hollow portion is in turn extended by a bearing 37 symmetrical with bearing 30 and receiving likewise a sleeve 38 which is tightened over it by a nut 37a. In this case however the sleeve 38 is formed with a non-rimmed flange 39 of smaller diameter than flange 33.

Internally, flange 33 and flange 39 receive annular linings 40 and 41 made of a substance such as rubber. Substantially through the center of each of these linings extends a stub portion of the sleeves 32 and 38, and a generously perforated open-ended cylinder 42 is engaged over said two stubs.

Engaged in a groove along the edge of flange 33 is a seal against which the end-section of cylindrical envelope 9 bears leaktightly. On the other hand, flange 39 receives, with an interposed peripheral seal, a ring 43 having a perforated bottom but formed with a border embodying a groove into which is placed a seal against which the opposite end-section of envelope 9 bears. The ring 43 is evenly serrated along the edge of its perforation and cooperates with the arms 44 of a star-shaped thrust piece, said arms being capable of allowing the ring 43 to pass through when the serrations are in registry with said arms, or to press ring 43 against flange 49 when the arms 44 face the solid portions separating the serrations. In order to locate this position, ring 43 is provided symmetrically with a peg 45 capable of engaging with a groove 46 formed on the tip of one of the arms.

The star formed by the arms 44 can be tightened axially against ring 43 by a nut 47 which is applied against the star hub and which moves along a screw-thread cut externally on sleeve 38.

The protruding stub 48 of bearing 37 is capable of being inserted, with its neighboring parts, into a lodging formed on the end of arm 8 when the latter is aligned with shaft 6, whereby to form a temporary support for the end of shaft 6.

To this end the outer cylindrical smooth portion of sleeve 38 cooperates rotatably and slidably with a bearing 49 forming part of said support 7. The corresponding portion of upstream sleeve 32 cooperates likewise with a bearing 50 of upstream support 5, but this upstream sleeve 32 provides an outer groove 51 bounded by two flanges and adapted to receive the prong tips of a fork 52, and this fork is set in oscillation by a lever 52 which is pivotally mounted, by means of a clevis, a pin and a bush 54, on upstream support 5.

As shown in FIGS. 5 and 6, bearing 50 includes a deeply hollowed lower shell 55 and an upper shell 56 associated to a clamping and unclamping member 57.

Figure 7:
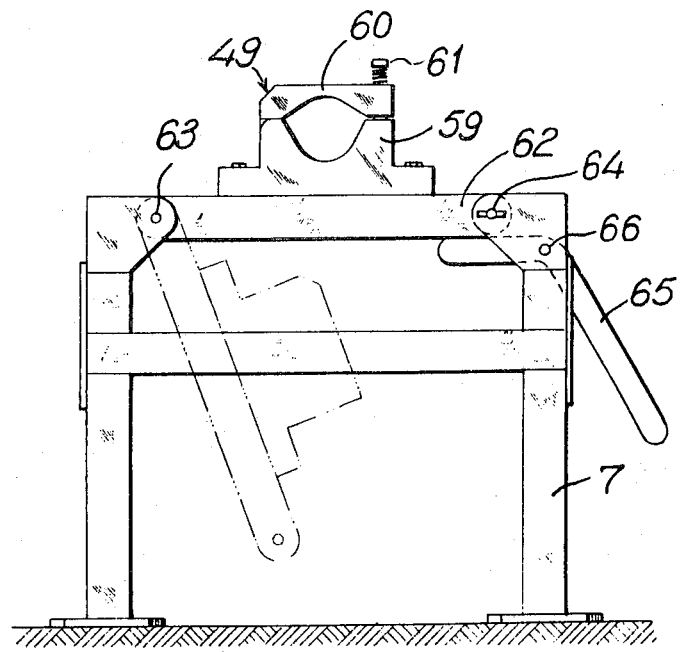
FIG. 7 is an end view of the downstream beam support with its retractable bearing.
Figure 8:
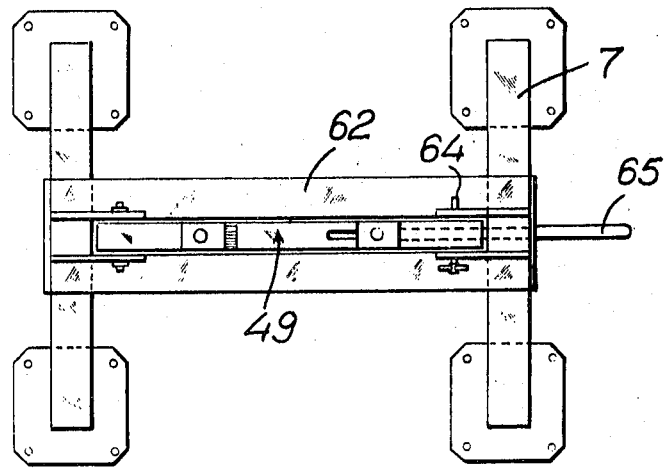
FIG. 8 is a top view of the beam support in FIG. 7.

The same applies in respect of lower shell 59, upper shell 60 and clamping member 61 of downstream support bearing 49, as shown in FIG. 7.

In addition, bearing 49 is supported by a cross-member 62 which is hinged about a pin 63 at one end of support 7 and rests at its other end on a retractable pin 64. This cross-member cooperates with an angled lever 65 which can rock about a pin 66 on support 7. The tip of lever 65 forms a support for the free end of hinged cross-member 62 in order to facilitate re-insertion of pin 64 when said bearing is replaced in position.

The above-described apparatus accordingly functions as follows:

To effect an impregnation, with envelope 9 in the position shown in dot-dash lines in FIG. 1, a layer of glass-fiber cloth is wrapped around the beam by any convenient means. After this has been done, shaft 6 bubbles advanced by means of lever 53 of upstream support 5 until junction is effected between stub 48 and arm 8. The bearings 49 and 50 are then unclamped.

Cylindrical envelope 9 is withdrawn and is supported by arm 8 during this phase. The support of bearing 49 is in the retracted position shown in FIG. 7, said bearing having previously been opened.

Once envelope 9 is in position (shown in solid lines in FIG. 1), bearing 49 is refitted and secured anew with pin 54 and then closed without being clamped. Bearing 50 may be unclamped and shaft 6 moved upstream until junction of union 22 takes place, after which the bearings are unclamped.

The arm 8, now cleared, can be moved away if need be.

Ring 43 is then fitted and the star-piece 44, tightened by its nut 47, ensures leaktightness of the envelope surrounding the roll of cloth. Vacuum pump 2 is then started up, together with an agitator (not shown) inside container 3.

At the same time, the cock 24 is opened to admit carbon dioxide into the chamber in order to produce a rinsing effect, and this carbon dioxide has an advantageous finishing effect on the glass threads, or at the very least transforms and improves the existing finish.

The valve 19 is opened for a very short time to create a small pressure drop in the upper part of container 3, thus ridding the resin of any bubbles.

After the debubbling has ceased, container 3 is vented to the atmosphere by means of a plug (not shown) provided at its top. Valve 24 is then shut off once more, union 12 established once more, and a vacuum is generated inside envelope 9 by opening valve 18, thereby degassing the roll of cloth.

With the resin maintained at a temperature consistent with its optimum viscosity (by means not shown), valve 20 is opened so as to cause the plastic to flow, under the effect of gravity and the suction caused by the vacuum maintained in the envelope, through conduit 21 and bore 34 and thereafter through the holes 34a in the bottom of said bore into the space existing between the outer wall of shaft body 36 and the perforated wall 42 within the roll of cloth. The resin contained in container 3 is thus caused to pass through the layers of cloth forming the roll in envelope 9, from the central region of said roll, while the degassing, the improved finish and the debubbling ensure even distribution and intimate contact.

As soon as impregnation has been fully completed, the vacuum is interrupted and the required dose of resin is passed into the beam shaft 6. The flow of resin having then been cut off, the transparency of envelope 9 permits inspection of the impregnated product and possible corrective action on the factors governing manufacture.

The envelope is then opened by unclamping star-piece 44, withdrawing shaft 6 (by unclamping the bearings and acting on the lever of the upstream support) to make junction with arm 8, retracting ring 43, and withdrawing envelope 9 after retraction of bearing 49.

At this point recourse is had to the calibrating station, which is positioned for coordination with the above-described apparatus. This station comprises, on a support 67, an idle drying roller 68, two rollers 69 and 70 effecting calibration by controlled throttling, and a beam 71 for receiving the impregnated cloth 72. The calibrating station further includes two supports for polyethylene film pay-out rollers 73 and 74, and, carried on a saddle, a motor unit 75 with speed-changing means for driving the beam 71. The cloth 72 leaving the impregnated roll 76 carried on beam 6 (the bearings of which are accordingly loosened), runs over roller 68, between rollers 69 and 70 (at least one of which includes means for adjusting its spacing from the other), and is finally rolled on to the pulling beam 71, with each of the two sides of the impregnated cloth covered with a film issuing from rollers 73 and 74.

It is to be noted that with such an arrangement, following rinsing with carbon dioxide, impregnation in vacuo of a complete roll of cloth is carried out in sheltered fashion in a single operation without manipulation of either the cloth or the resin. The impregnation is then calibrated with the desired percentage of resin, and this is followed by packaging and possible final bagging of the roll of cloth protected thus, with a view to indoor storage, which storage can easily be protracted, notably in a cold environment.

The cloth is thoroughly impregnated and allows no filaments to show, the resin being very uniformly distributed following calibration, with the surface of the cloth becoming translucid — an indication of perfect debubbling and wetting.

The absence of bubbles coupled with the above-mentioned properties means that it is possible to produce a pre-impregnated cloth capable of forming very-high-grade products, notably with regard to static-load and fatigue strengths.

It goes without saying that many changes may be made in the forms of embodiment and in the various stages of the method hereinbefore described, without departing from the scope of the invention. Thus, instead of providing mobility for the wall of the impregnation chamber, use could be made of a fixed chamber and means for moving the beam supporting the roll of cloth in order to allow the latter to be inserted into the chamber before impregnation and withdrawn therefrom after impregnation, which alternative arrangement liberates the impregnating apparatus and allows separate use of the calibration and packaging station independently of the impregnation operations proper. Further, the production rate could be increased if need be by multiplying the number of stations involving the longest operating times and reducing the number of stations where operating times are relatively short.

What we claim is:

1. Apparatus for impregnating fabrics, and more particularly, though not exclusively glass cloths with plastics such as synthetic resins still in a fluid state, by subjecting a roll of the fabric to the action of a substance intended to improve the intimacy of the bond between the fibers and the impregnating substance, by simultaneously feeding the impregnating substance into the interior of the roll while subjecting said roll and said substance to a vacuo, comprising, in combination, an impregnating station, an impregnation chamber, means for inserting a beam carrying a roll of fabric to be treated into said impregnation chamber, means for extracting said treated roll from said chamber, at least one station having means for calibrating said impregnation, and at least one station having means for packaging the calibrated fabric, the two latter-mentioned means being at least partly coordinated.

2. Apparatus as claimed in claim 1, wherein the impregnation chamber includes a wall which is movable relatively to a beam supporting a roll of cloth.

3. Apparatus as claimed in claim 2, wherein a chamber wall is retractable coaxially with the beam and cooperates in its retracted position with a support formed by a pivotally mounted outrigger arm comprising means for receiving the end of said beam, which beam is accordingly longitudinally slidable through bearings of which one is retractable on the side proximate said arm to permit passage of said wall.

4. Apparatus as claimed in claim 1, wherein the beam includes means for receiving and longitudinally distributing the resin inside the roll of cloth to be impregnated, the envelope wall bearing a plurality of vacuum distributing connections communicating through pipe means to a safety pot which is in turn connected to a vacuum pump through a conduit embodying a detachable union and a shut-off valve.

5. Apparatus as claimed in claim 1, wherein the impregnating station includes a vacuum pump, resin-distributing means likewise connected to said vacuum pump and carbon dioxide distributing means connected through a detachable union to an inlet of said distribution means of said beam.

6. Apparatus as claimed in claim 1, wherein the beam bearings are openable and clampable, one of them being mounted on a support comprising means for limited axial sliding of said beam, and the other being retractably mounted laterally on another support whereby to provide passage for the movable envelope wall.

7. Apparatus as claimed in claim 2, wherein the envelope wall cooperates with an upstream end rigid with the beam and an opposite downstream end is formed by a plurality of parts of which at least one is retractable whereby to provide the necessary clearance for said wall.

8. Apparatus as claimed in claim 1, wherein a calibrating station includes a drying roller, a pair of throttling rollers of which at least one is carried in a support permitting adjustment of its spacing from the other roller, and a beam for receiving the cloth having undergone calibrated impregnation, which beam is associated to rollers for paying out packaging sheets and to a drive mechanism of adjustable speed.

9. Apparatus as claimed in claim 5, wherein the resin-distributing means include a container capable of being placed in communication with said vacuum pump through pipe means whereby to effect a preliminary debubbling of the resin, said container comprising means for agitating its contents and possibly means for maintaining said resin at the temperature corresponding to its optimum viscosity.

10. Apparatus as claimed in claim 9, wherein said distributing means and said container in particular include venting means for the purpose of using atmospheric pressure to impregnate, in the processing chamber still subjected to a vacuum, the seal-and-thrust-piston-forming surplus resin in the container.

* * * * *

UNITED STATES PATENT OFFICE
CERTIFICATE OF CORRECTION

Patent No. 3,693,317  Dated Sept. 26, 1972

Inventor(s) Andre Violleau et al

It is certified that error appears in the above-identified patent and that said Letters Patent are hereby corrected as shown below:

On the cover sheet insert --[30] Claims priority, application France, Dec. 18, 1968, PV178866--.

Signed and sealed this 27th day of March 1973.

(SEAL)
Attest:

EDWARD M. FLETCHER, JR.
Attesting Officer

ROBERT GOTTSCHALK
Commissioner of Patents